United States Patent
Lofquist et al.

[11] 3,859,045
[45] Jan. 7, 1975

[54] ETHOXYLATED ALIPHATIC TERTIARY AMINES TO REDUCE OZONE ATTACK ON DYES IN POLYAMIDE FIBERS

[75] Inventors: Robert Alden Lofquist; Peter Reginald Saunders; Richard Eugene Mayer, all of Richmond, Va.

[73] Assignee: Allied Chemical Corporation, New York, N.Y.

[22] Filed: Apr. 3, 1972

[21] Appl. No.: 240,812

Related U.S. Application Data

[63] Continuation-in-part of Ser. No. 165,352, July 22, 1971, abandoned.

[52] U.S. Cl. ............................................. 8/165, 8/168
[51] Int. Cl. ............................................. D06p 5/02
[58] Field of Search ............................... 8/165, 74

[56] References Cited
UNITED STATES PATENTS

| | | | |
|---|---|---|---|
| 2,409,325 | 10/1946 | Ward | 8/165 |
| 2,706,142 | 4/1955 | Von Glahn | 8/165 |
| 2,828,180 | 3/1958 | Sertorio | 8/62 |
| 3,071,427 | 1/1963 | Buehler | 8/22 |
| 3,096,139 | 7/1963 | Hendle | 8/21 A |
| 3,199,942 | 8/1965 | Kuth et al. | 8/169 |
| 3,716,328 | 2/1973 | Mayer | 8/165 |

OTHER PUBLICATIONS

Exparte Weisbein et al., Patent File No. 3,679,351, 8 pages, Paper No. 18, Appeal No. 970-42.
Salvin, American Dyestuff Reporter, Pages 12-20 TP890A512.

*Primary Examiner*—Donald Levy
*Attorney, Agent, or Firm*—Richard A. Anderson

[57] ABSTRACT

When from about 0.1 percent to about 8 percent of tertiary amines such as:

A.

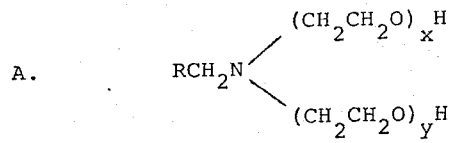

where R is an alkyl or aralkyl radical having seven to 24 carbon atoms, R can contain one or two oxygen atoms as ester or ether linkages, and $x$ and $y$ are integers such that $x$ and $y$ are each at least 1, and $x + y$ is not more than 10, preferably 2, or ditertiary amines such as

B.

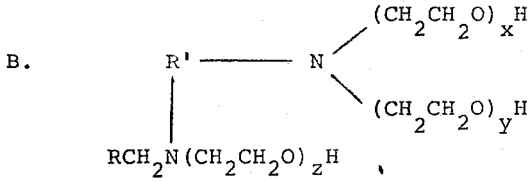

where R is an alkyl or aralkyl radical having seven to 24 carbon atoms, R can contain one or two oxygen atoms as ester or ether linkages, R' is alkylene, and has from two to ten carbons, and $x$, $y$ and $z$ are each at least 1 and total 10, or preferably 3, are coated on nylon fiber or added to nylon polymer before spinning, improved dyefastness is achieved when the fiber is exposed to ozone.

10 Claims, No Drawings

ETHOXYLATED ALIPHATIC TERTIARY AMINES TO REDUCE OZONE ATTACK ON DYES IN POLYAMIDE FIBERS

CROSS REFERENCE TO RELATED APPLICATION

This application is a continuation-in-part application of copending application Ser. No. 165,352, filed July 22, 1971 and now abandoned, by Robert A. Lofquist, Peter R. Saunders, and Richard E. Mayer.

BACKGROUND OF THE INVENTION

The object of this invention is to reduce or prevent the fading of dyed nylon fabrics caused by ozone. By fading is meant loss of fastness of the dye, i.e., the dye becomes less bright or changes color, for example, dark blue to light blue.

Ozone is present in air at sea level at a concentration of only 1 to 5 parts per hundred million. Only under conditions of heavy smog does it rise as high as 60 parts per hundred million. Despite this extremely low concentration of ozone, severe fading is observed.

Ozone is an allotropic form of oxygen. The molecule of ozone consists of three atoms of oxygen whereas a molecule of oxygen contains two atoms of oxygen. Ozone is formed in the upper atmosphere by the action of high energy radiation from the sun splitting oxygen molecules into two oxygen atoms. These atoms then combine with oxygen ($O_2$) molecules to form ozone ($O_3$). This ozone then diffuses down through the atmosphere.

Ozone is an electrophilic reagent, that is, it searches out and attacks electron pairs such as those existing with carbon-carbon double bonds.

The dyes which are attacked are usually anthraquinone type disperse dyes, although it is believed that under severe conditions almost all dyes might be affected by ozone.

One of the most sensitive dyes to ozone fading is disperse blue 3. The major consituent of disperse Blue 3 has the structure:

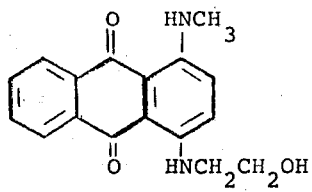

Basic anthraquinone dyes, such as C.I. Basic Blue 47, are also subject to ozone fading as shown in Examples II to XVII. Typical anthraquinone dyes are shown by U.S. Pat. No. 2,900,216. Analysis of C.I. Basic Blue 47 or Astrazon Blue 3RL has shown it is quaternized from the compound labeled 2 in the list of compounds on page 1 of U.S. Pat. No. 2,900,216. Thus, the structure would be:

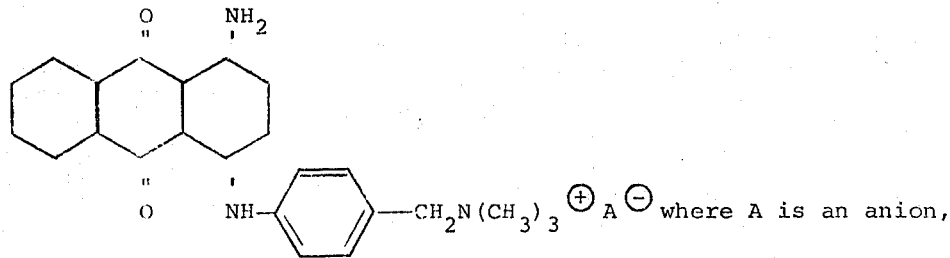

such as $Cl^{\ominus}$. The 1963 Supplement of the Colour Index also indicates Astrazon Blue 3 RL is an anthraquinone.

The dye diffuses through the fiber to contact the ozone at the surface of the fiber. Part of the evidence for this is that any treament or additive that increases the mobility of the dye, increases its ozone fading.

There is some evidence that water is necessary to give ozone fading, but whether its action is that it swells the nylon or is involved in a primary or secondary oxidation step is unclear.

Ozone fading can be decreased by reduction of the specific surface area of the yarn. This is undesirable when a bulky yarn is required. Ozone fading can also be decreased by changes in polymer morphology and orientation but these techniques are inherently expensive.

SUMMARY OF THE INVENTION

A method and composition have been found for improving fastness of dyes when exposed to ozone in polycarbonamide fibers. The method is exposing the fibers to ozone in the presence of a compound selected from the group consisting of tertiary amines and ditertiary amines of the formula

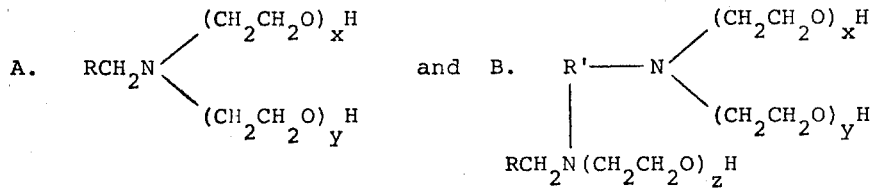

where R is an alkyl or aralkyl radical having seven to 24 carbon atoms, R can contain one or two oxygen atoms as ester or ether linkages, R' is a straight chain alkyl radical having two to ten carbon atoms, and $x$, $y$, and $z$ are each at least 1 and $x$, $y$ and $z$ total not more than 15. One of these compounds or mixtures of them can be coated on nylon fiber in amounts of from about 0.1 to about 8 percent, preferably from about 0.1 to about 5 percent on the weight of the fiber. Alternatively, a composition can be prepared from a nylon polymer containing from about 0.1 to 8 percent by weight of the same tertiary amines. The rate of fading of the dye in nylon fibers, particularly disperse or cationic dyes, is substantially reduced by the incorporation or coating of these ethoxylated aliphatic tertiary or ditertiary amines of the above formula. These tertary and ditertiary amines are effective without discoloring the yarn.

DESCRIPTION OF THE PREFERRED EMBODIMENTS

Some of the preferred embodiments of this invention are set forth in the following examples. The method of testing for ozone fading was similar to the AATCC 129–1968 set forth on page 334/15 of the *Journal of American Association of Textile Chemists and Colorist*, Jul. 30, 1969, Vol. 1, No. 16 in an article entitled, "A New Test Method For Ozone Fading at High Humidity," by Victor S. Slavin.

EXAMPLE I

The following are examples of the subject additives and their behavior on being added to nylon polymer chips, spun into yarn, dyed, and exposed to ozone.

The polymer was polycaprolactam of about 20,000 number average molecular weight, about 60 formic acid reactive viscosity, (FAV), about 50 amine ends per $10^6$ grams polymer and 50 carboxyl ends per $10^6$ grams polymer, which contained about 10 ppm of manganese as manganese chloride, about 25 ppm of phosphorous as hypophosphorous acid, and about 0.13% $TiO_2$ as a delustrant. The additives were added to the nylon polymer immediately before spinning.

The polymer was spun into 16 filaments having a total denier of about 230, at a spinning temperature of about 260° to 265°C. The yarn was drawn at a ratio of 3.2.

The yarn was knitted into sleeves and dyed with Olive 1 dye which consists of 0.069 percent on weight of fabric (O.W.F.) of CI. Disperse Blue 3, such as Celliton Blue FFRN, (1-methylamino-4-hydroxyethylaminoanthraquinone), 0.0807 percent (O.W.F.) Celliton Pink RF, (CI Disperse Red 4) and 0.465 percent (O.W.F.) Celliton Yellow GA (CI Disperse Yellow 3). The Disperse Blue 3 is especially sensitive to ozone fumes.

The sleeves were scoured before dyeing with a solution of 0.5 percent (O.W.F.) Triton X-100, a nonionic alkaryl polyether alcohol by Rohm and Haas and 2.0 percent (O.W.F.) trisodium phosphate at 160°F. for about 30 miniutes.

The sleeves were dyed with the above dyes and with 0.5 percent (O.W.F.) Triton X-100, and 2.0 percent (O.W.F.) trisodium phosphate, at 205°F. for 1 hour. The sleeves were dyed individually so that the same amount of dye would be picked up by each sleeve.

The sleeves were then subjected to an ozone atmosphere of about 80 pphm (parts per hundred million) ozone at a temperature of 104°F., at a relative humidity of at least 95 percent, for 3 cycles. A cycle is that amount of exposure which occurs when a nylon control fabric dyed Olive 1 shows a specified color change as measured by a colorimeter.

This method is similar to, but not identical with, proposed AATCC Test Method 129–1968.

The results of the sleeves being exposed to three cycles of ozone are as follows:

Ethomeen C12 is an ethoxylated cocoa amine, with two moles of ethylene oxide per mole of amine.

Ethomeen T12 is an ethoxylated tallow amine with two moles of ethylene oxide per mole of amine.

Ethomeen 18/12 is an ethoxylated stearyl amine with two moles of ethylene oxide per mole of amine.

Ethoduomeen TD13 is a polyethoxylated diamine where the nitrogens are separated by three or four methylene groups, a tallow radical is attached to one nitrogen, with three moles of ethylene oxide per mole of diamine.

$\Delta E$ is a measure of the change of color, a smaller $\Delta E$ being less fading.

COLOR DIFFERENCE ($\Delta E$)

$$\Delta E = \sqrt{(\Delta L)^2 + (\Delta a)^2 + (\Delta b)^2}$$

where
$\Delta L = L_1 - L_2$
$\Delta a = a_1 - a_2$
$\Delta b = b_1 - b_2$

L, a and b are readings on the Hunterlab Color Difference Meter. L is a 100-0 reading of white to black measurement. a measures redness when + and gray when zero and green when minus. b measures yellow when +, gray when zero and blue when minus.

The Hunterlab Color Difference Meter measures color as seen in average daylight, in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three "primary" lights. The measurements made, therefore, correspond to the way the average human eye responds to light, as these responses are set forth in the CIE "Standard Observer." The "Standard Observer" is a table of values derived from experiments with human observers, and recommended for use in 1931 by the International Commission on Illumination (ICI).

EXAMPLE II.

One thousand (1,000) grams of polycaprolactam of 60 FAV, and containing about 90 equivalents of sulfonate as sodium sulfoisophthalic acid having about 80 carboxyls and 20 amines per $10^6$ grams of polymer were blended with 10 grams of Ethomeen T12. This polycarbonamide has a large number of sulfonate groups along the polymer chain. This blend was spun into yarn at a temperature of 280°C., plied and drawn at 3.2 draw ratio into a 140 filament 2,100 total denier yarn. The filaments had a Y-cross section with a 3.2 modification ratio.

This yarn and a yarn made in the same manner, but without blending in any additive, were both knitted into sleeves. These sleeves were heat set by steam treating in an autoclave at 230°F. for 5 minutes followed by 3 10-minute cycles of steam treatment at 260°F.

The sleeves were dyed to a moss green in a dye bath described below containing Astrazon Blue 3R1. This dye is known to be sensitive to ozone. Percents are on weight of fabric:

0.3 percent Sevron Yellow 8GMF (duPont); (CI Basic Yellow-53)

0.25 percent Astrazon Blue 3RL (Verona); (CI Basic Blue 47)

2 percent Hipochem PND-11, amine salt of alcohol ester by Highpoint Chemical Company 1 percent Hipochem CDL-60 -nonionic surfactant by Highpoint Chemical Company, (chemical structure not available);

enough monosodium and/or disodium phosphate to adjust pH to 7 ± 0.2.

The sleeves were then exposed to 9 cycles of ozone, as described in Eample I. The results are shown in the following table:

| Yarn | 3 cycle | | 6 cycle | | 9 cycle | |
| --- | --- | --- | --- | --- | --- | --- |
| | ΔL | ΔE | ΔL | ΔE | ΔL | ΔE |
| Control nylon | 3 | 5 | 9 | 14 | 15 | 21 |
| 1% Ethomeen T12 | 2 | 2 | 4 | 6 | 7 | 10 |

EXAMPLE III

Other blends were made and processed as in Example II. The results of ozone testing are tabulated below:

| Additive to Polymer | 3 cycle ΔE | 9 cycle ΔE |
| --- | --- | --- |
| None (Control) | 5 | 21 |
| 1% Ethomeen 18/12 | 2 | 10 |

EXAMPLE IV

Cationic dyeable yarn like that in Example II of 2,100 total drawn denier, 140 filaments, Y-cross section, of 3.2 modification ratio, was treated with an aqueous spin finish containing sufficient Ethomeen T12 so that 1 percent of it was put on the fiber. The drawn yarn was treated and tested as in Example II. The results of ozone testing are as follows:

| | 3 cycle | | 6 cycle | | 9 cycle | |
| --- | --- | --- | --- | --- | --- | --- |
| | ΔL | ΔE | ΔL | ΔE | ΔL | ΔE |
| Control | 5 | 8 | 15 | 22 | 19 | 28 |
| 1% Ethomeen T12 (OWF) | 2.5 | 4.5 | 7 | 10 | 10 | 15 |

EXAMPLE V

Cationic dyeable yarn was spun and drawn as in the control of Example IV, but a portion of the yarn was treated with an overfinish consisting of a 20 percent solution of Ethomeen 18/12 in ethanol. About 5 percent pickup of the overfinish (on weight of fiber, OWF) was obtained. Thus, about 1 percent (OWF) of Ethomeen resulted. The yarns were treated as in Example II and submitted to ozone testing. The results are as follows:

| | 3 cycles | | 6 cycles | | 9 cycles | |
| --- | --- | --- | --- | --- | --- | --- |
| | ΔL | ΔE | ΔL | ΔE | ΔL | ΔE |
| Control | 5 | 8 | 15 | 22 | 19 | 28 |
| With Overfinish | 0.5 | 1 | 1.5 | 2 | 1.5 | 3 |

EXAMPLE VI

These ethoxylated aliphatic amines may also be applied to textiles or carpet as a minor component in a dye bath.

A sleeve similar to the control sleeve of Example II was dyed in a dyebath containing the dyes of Example II. A second portion of the same sleeve was dyed similarly but with the addition of 1 percent Ethomeen T12 (on the weight of Fiber) to the dye bath. The dyed sleeves were exposed to ozone. The results are below:

| | 3 cycles | | 6 cycles | | 9 cycles | |
| --- | --- | --- | --- | --- | --- | --- |
| | ΔL | ΔE | ΔL | ΔE | ΔL | ΔE |
| Control | 3.5 | 5 | 9 | 13 | 13 | 19 |
| With 1% Ethomeen T12 in Dye Bath | 0.5 | 1 | 1 | 2.5 | 3 | 5 |

EXAMPLE VII

Cationic dyeable yarn like that in Example IV except having about 81 equivalents of sulfonic groups, per $10^6$ grams of polymer, 46 FAV, 89 carboxyl ends, and 25 amine ends per $10^6$ grams of polymer was spun as in Example II without Ethomeen compound added, drawn at about 3.2 draw ratio to obtain yarn of same denier, modification ratio, and filament count as Example II, and heat set as in Example II. The sleeves were dyed moss green in a dyebath composition as in Example II.

The spin finish contained Ethomeen T12 to achieve the percent on weight of yarn given in the table below. The sleeves were then exposed to 9 cycles of ozone, as described in Example I. The results are shown in the table below:

| Sample | Percent Ethomeen T12 on Yarn | 3 cycles | | 6 cycles | | 9 cycles | |
| --- | --- | --- | --- | --- | --- | --- | --- |
| | | ΔL | ΔE | ΔL | ΔE | ΔL | ΔE |
| A | 0 (Control) | 7 | 4 | 15 | 10 | 25 | 18 |
| B | 0.31 | 3 | 2 | 10 | 7 | 19 | 13 |
| C | 0.46 | 2 | 1 | 7 | 5 | 13 | 9 |
| D | 0.87 | 1 | 0.5 | 4 | 2 | 8 | 5 |

EXAMPLE VIII

Using polymer of the same characteristics and at similar spin conditions, including finish, to get the same yarn as in Example VII, a 5,000 No. commericial plant trial was conducted. About 1.1 percent Ethomeen T12 was applied on the weight of yarn. The yarn was drawn 2.9 times and chopped to 7 inch length, carded and spun into staple yarn with a 2 cotton count. The yarn was woven into sleeves, and heat set as in Example II. Following are the results of ozone exposure after up to nine cycles as described in Example I. Dyeing was as in Example VII.

| | 3 cycles | | 6 cycles | | 9 cycles | |
| --- | --- | --- | --- | --- | --- | --- |
| | ΔL | ΔE | ΔL | ΔE | ΔL | ΔE |
| Control | 5 | 7 | 8 | 12 | 12 | 17 |
| Sample | 0.5 | 0.7 | 1 | 1.5 | 1.5 | 3 |

EXAMPLE IX

A second plant trial duplicating Example VIII was carried out but only 0.6 percent on weight of yarn of Ethomeen T12 was applied with the following results:

| | 3 cycles | | 6 cycles | | 9 cycles | |
| --- | --- | --- | --- | --- | --- | --- |
| | ΔL | ΔE | ΔL | ΔE | ΔL | ΔE |
| Control | 5 | 7 | 10 | 14 | 15 | 21 |
| Sample | 1 | 2 | 4 | 6 | 7 | 10 |

EXAMPLE X

A bright, sebacic acid terminated polycaprolactam with 70 FAV, about 63 carboxyl ends and 15 amine ends per $10^6$ equivalents of polymer were commercially spun and drawn at a ratio of 3.05 to a 6,400 denier, 140 filament Y-cross section, 3.2 modification ratio yarn. This nylon has a preponderance of terminal carboxyl groups. The yarn was coated with a spin finish to provide 0.55 percent on weight of yarn of Ethomeen T12; and processed as in Example II except the dye was Disperse Olive II from a dyebath as follows (percent on weight of fabric):

0.082 percent Latyl Cerise Y;
0.44 percent Celliton Yellow GA;
0.143 percent Celanthrene Blue CR;
2 percent trisodium phosphate;
0.5 percent Triton X-100 (ethoxylated nonyl phenol)

Testing for ozone fading as in Example I gave the following results:

|  | 3 cycles | | 6 cycles | | 9 cycles | |
| --- | --- | --- | --- | --- | --- | --- |
|  | ΔL | ΔE | ΔL | ΔE | ΔL | ΔE |
| Control | 1.5 | 3 | 4 | 6 | 5 | 9 |
| Sample | −0.5 | 1 | 0.5 | 1.5 | 0.5 | 2.5 |

EXAMPLE X(A)

The same undrawn yarn as in Example X was drawn at ratio of 2.9 and processed into heat set staple yarn sleeve as in Example VIII, then dyed and tested as in Example I for ozone fading. Results were as follows:

|  | 3 cycles | | 6 cycles | | 9 cycles | |
| --- | --- | --- | --- | --- | --- | --- |
|  | ΔL | ΔE | ΔL | ΔE | ΔL | ΔE |
| Control | 5 | 9 | 11 | 19 | 14 | 24 |
| Sample | 2 | 3 | 4 | 7 | 7 | 12 |

Dyed with formulation as in Example X above, results were as follows:

|  | 3 cycles | | 6 cycles | | 9 cycles | |
| --- | --- | --- | --- | --- | --- | --- |
|  | ΔL | ΔE | ΔL | ΔE | ΔL | ΔE |
| Control | 1 | 2.5 | 2.5 | 4 | 4 | 7 |
| Sample | 0 | 0.5 | 1 | 2 | 1 | 3 |

EXAMPLE XI

Using polymer as in Example VII, chips were blended with 1 percent by weight of Ethomeen T12 and Ethoduomeen TD-13 and processed and tested as in Example II. Results were as follows:

|  | 3 cycles | | 6 cycles | | 9 cycles | |
| --- | --- | --- | --- | --- | --- | --- |
|  | ΔL | ΔE | ΔL | ΔE | ΔL | ΔE |
| Control | 5 | 8 | 11 | 16 | 19 | 26 |
| Sample with T12 | 1 | 2 | 6 | 7 | 11 | 14 |
| Sample with TD-13 | 2 | 3 | 4 | 6 | 9 | 13 |

EXAMPLE XII

Using yarn of the same characteristics as in Example VII, a spin finish of Ethomeen T-12 was applied to yarn to the weight on yarn shown below. Processing and testing was as in Example VIII, with the following results:

|  | 3 cycles | | 6 cycles | | 9 cycles | |
| --- | --- | --- | --- | --- | --- | --- |
|  | ΔL | ΔE | ΔL | ΔE | ΔL | ΔE |
| Control | 7 | 10 | 15 | 22 | 21 | 29 |
| 0.21% T12 | 5 | 8 | 10 | 16 | 16 | 24 |
| 0.41% do. | 2 | 3.5 | 6 | 9 | 11 | 16 |
| 0.52% do. | 1.5 | 3 | 4 | 7 | 9 | 13 |
| 0.9% do. | 0.5 | 1.5 | 4 | 6 | 8 | 11 |
| 1.08% do. | 0.5 | 1 | 1.5 | 3 | 5 | 7 |

EXAMPLE XIII

A spin finish to give 0.7 percent weight on yarn of Ethomeen T12 to the yarn prepared from polymer as in Example X and spun, drawn, and heat-set as in Example II to provide the following results, from testing as in Example I and dyeing as in Examples X and X(A).

| Olive I dye | 3 cycles | | 6 cycles | | 9 cycles | |
| --- | --- | --- | --- | --- | --- | --- |
|  | ΔL | ΔE | ΔL | ΔE | ΔL | ΔE |
| Control | 5 | 9 | 12 | 19 | 16 | 24 |
| Sample | 1 | 2.5 | 6 | 9 | 9 | 15 |
| Olive II dye | | | | | | |
| Control | 1 | 2 | 4 | 6 | 6 | 9 |
| Sample | −0.5 | 0.5 | 0.5 | 2 | 2 | 4 |

EXAMPLE XIV

Repeating Example XIII, but using a light stable, semi-dull polycaprolactam of 70 FAV, 63 carboxyl end groups and 15 amine end groups per $10^6$ equivalents of polymers yielded the following results.

| Olive I dye | 3 cycles | | 6 cycles | | 9 cycles | |
| --- | --- | --- | --- | --- | --- | --- |
|  | ΔL | ΔE | ΔL | ΔE | ΔL | ΔE |
| Control | 7 | 10 | 11 | 19 | 19 | 27 |
| Sample | 1.5 | 2.5 | 6 | 9 | 11 | 16 |
| Olive II dye | | | | | | |
| Control | 0 | 1 | 6 | 8 | 8 | 12 |
| Sample | 0 | 0.5 | 1.5 | 2.5 | 3 | 4 |

EXAMPLE XV

Example VII was repeated using the percent on weight of yarn shown of Ethomeen T12, Ethoduomeen TD-13 and Ethomeen T-15. Results were as follows:

|  | 3 cycles | | 6 cycles | | 9 cycles | |
| --- | --- | --- | --- | --- | --- | --- |
|  | ΔL | ΔE | ΔL | ΔE | ΔL | ΔE |
| Control | 4 | 7 | 16 | 23 | 21 | 30 |
| 0.8% T12 | 1.5 | 2 | 5 | 8 | 9 | 14 |
| 0.8% TD-13 | 0.5 | 1.5 | 5 | 7 | 8 | 13 |
| 1.0% T-15* | 1.5 | 2 | 4 | 6 | 8 | 12 |

*Ethomeen T-15 is an ethoxylated tallow amine with 5 moles of ethylene oxide per mole of amine.

EXAMPLE XVI

The procedure of Example VIII was repeated on a small scale, using a similar polymer but containing about 90 equivalents of sulfonic groups per $10^6$ grams of polymer. Conventional spin finish was used, but various amounts of Ethomeen T12 were added in the dyebath rather than in the spin finish. Percent shown is on weight of fabric. Results were as follows:

|         | 3 cycles |    | 6 cycles |    | 9 cycles |    |
|---------|----------|----|----------|----|----------|----|
|         | ΔL       | ΔE | ΔL       | ΔE | ΔL       | ΔE |
| Control | 4        | 6  | 11       | 16 | 17       | 24 |
| 0.1% T12| 3        | 5  | 10       | 14 | 15       | 21 |
| 0.5% T12| 1        | 2  | 6        | 8  | 9        | 12 |
| 1.0% T12| 0.5      | 1  | 2        | 4  | 6        | 8  |

EXAMPLE XVII

The procedure of Example VIII was repeated on a smaller scale using a cationic dyeable nylon 6,6 staple (duPont T-367). Conventional spin finish was used, but various amounts of Ethomeen T-12 were added in the dyebath rather than in the spin finish. Percent shown is on weight of fabric. Results were as follows:

|         | 3 cycles |    | 6 cycles |    | 9 cycles |    |
|---------|----------|----|----------|----|----------|----|
|         | ΔL       | ΔE | ΔL       | ΔE | ΔL       | ΔE |
| Control | 2        | 4  | 3        | 5  | 5        | 7  |
| 0.1% T12| 1.5      | 2.5| 3        | 5  | 5        | 7  |
| 0.5% T12| 0.5      | 1  | 2        | 3  | 3        | 4  |
| 1.0% T12| 0.5      | 1  | 1        | 2  | 2        | 3  |

EXAMPLE XVIII

A polycaproamide was made similar to the polymer in Example I, but with the addition of 2 percent by weight of Ethomeen T12 to the monomer, caprolactam. The polymer was spun into yarn, dyed and exposed to ozone. A second polymer was made in the same manner, but with the initial addition of 3 percent by weight of Ethomeen T12. It was also spun into yarn, dyed and exposed to ozone as in Example I. A control yarn was made, dyed and exposed to ozone. The results of the 3 cycle exposure tests are as follows:

|                 | ΔE  | ΔL  |
|-----------------|-----|-----|
| Control         | 7.3 | 4.8 |
| 2% Ethomeen T12 | 4.6 | 2.6 |
| 3% Ethomeen T12 | 4.6 | 2.4 |

It can be seen that the additive is relatively less effective when added prior to polymerization.

EXAMPLE XIX

Polycaprolactam staple yarn as in Example VII was spun and processed as in Example VII but with various aqueous spin finishes. All finishes were 20 percent "solids" and 80 percent water. Of the "solids," 40 percent was the additive listed below.

The yarns were drawn, knitted into sleeves, autoclaved, dyed and exposed to ozone. The results of ozone exposure were as follows:

| Additive | Finish Pickup | ΔE after 3 cycles |
|----------|---------------|-------------------|
| None, control | — | 12.2 |
| N,N-bis(2-hydroxyethyl)-1-amino-18-phenyloctadecane | 10.2 | 8.0 |
| N,N-bis(2-hydroxyethyl)-2-amino octadecane | 10.0 | 7.5 |

EXAMPLE XX

Polymer made from caprolactam, having a formic acid relative viscosity of 46, about 81 sulfonic groups from sodium sulfoisophthalate, about 90 carboxyls and about 25 amine ends per million grams of polymer, was spun into yarn. The yarn, coated with a commercially aqueous spin finish was drawn at a draw ratio of 2.9. The yarn had a Y cross-section with a 3.2 modification ratio and each filament had a denier of 15.

The yarn was chopped into 7 inch lengths, carded and spun into staple yarn having a cotton count of 2. The yarn was knitted into sleeves, and heat set by steam treating in an autoclave at 230°F. for 5 minutes followed by 3 10-minute cycles of steam treatment at 260°F.

The sleeves were dyed to a moss green in a dye bath composed as follows:

0.3 percent Sevron Yellow 8GMF (DuPont)
0.25 percent Astrazon Blue 3RL (Verona)
2.0 percent Hipochem PND-11
1.0 percent Hipochem CDL-60 and monosodium and/or disodium phosphate to adjust the pH to 7.0 ± 0.2

The sleeve was cut into sections about 5 inches long and each section was weighed. The sleeves were then dipped in the ethanol solutions shown below for 20 minutes. The sleeves were then removed from the solutions, dried and reweighed. The amount of material coated on the sleeves from each solution was based on the difference in weight between the coated and the uncoated sleeves, compared to the control.

The sleeves were then exposed to 3 cycles of ozone in an atmosphere of about 80 parts per hundred million of ozone at a temperature of a 104°F., at a relative humidity of at least 95 percent. A cycle is that exposure which is completed when the internal nylon standard, dyed olive I, has faded sufficiently to give a Δ E of 2.8. The measurement Δ E is discussed under "Description of Preferred Embodiments."

The solutions, the amount of coating and the results of ozone exposure are listed below:

|     |                                                                                  | % Pickup | ΔE  |
|-----|----------------------------------------------------------------------------------|----------|-----|
| (a) | Control—200 ml. of ethanol                                                       | 0        | 13.4|
| (b) | 1 gram of N,N-bis(2-hydroxyethyl)-1-amino-18-phenyl stearylamine in 200 ml. ethanol | 1.3   | 2.0 |
| (c) | 1 gram of N,N-bis(2-hydroxyethyl)-2-amino octadecane in 200 ml. ethanol          | 1.1      | 1.5 |
| (d) | 1 gram N,N-bis (2-hydroxyethyl)-2'-ethyl hexylamine in 200 ml. ethanol           | 0.8      | 2.3 |
| (e) | 1 gram N,N,N'-tris(2-hydroxyethyl)-2-amino octadecane in 200 ml. ethanol         | 1.1      | 1.7 |
| (f) | 1 gram bis ethoxylated Primene 81R* (2 moles ethylene oxide per mole of amine) in 200 ml. ethanol | 0.9 | 2.2 |

*Primene 81R is principally t-$C_{12}H_{25}NH_2$ to t-$C_{14}H_{29}NH_2$ manufactured by Rohm & Haas.

We claim:

1. In a method for dyeing polycarbonamide fibers said polycarbonamide having a preponderance of terminal carboxyl groups or is a polyarbonamide with a large number of sulfonate groups along the polymer chain with anthraquinone dyes the improvement comprising
coating said fiber with a substance consisting essentially of a compound selected from the group consisting of tertiary amines and ditertiary amines of the formula A. 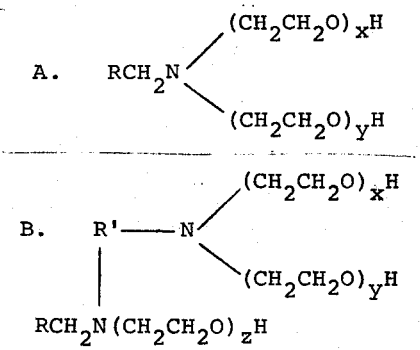

or mixtures of them where R is straight chain alkyl, branched chain alkyl or aralkyl containing 7 to 24 carbon atoms, said R can contain up to two oxygen atoms as ester or ether linkages, R' is a straight chain alkylene radical having 2 to 10 carbon atoms, and $x$, $y$ and $z$ are each at least 1 and $x$, $y$ and $z$ total not more than 15,
 so that from about 0.1 to about 8 percent on weight of fiber of said compound remains on said fibers to reduce the fading of dyed polycarbonamide fabrics caused by ozone.

2. The method of claim 1 wherein the amine compound is present in amount between 0.1 and 5 percent by weight of fiber.

3. In a method for dyeing polycarbonamide fibers with antraquinone dyes the improvement comprising coating said fiber with a substance consisting essentially of a compound selected from the group consisting of tertiary amines and ditertiary amines of the formula A. 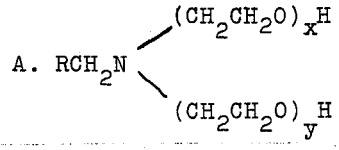

B. 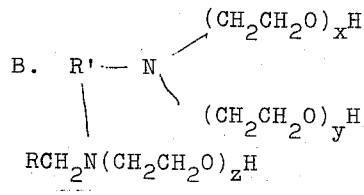

or mixtures of them where R is straight chain alkyl, bracnched chain alkyl or aralkyl containing 7 to 24 carbon atoms, said R can contain up to two oxygen atoms as ester or ether linkages, R' is a straight chain alkylene radical having 2 to 10 carbon atoms, and $x$, $y$ and $z$ are each 1
 so that from about 0.1 to about 8 percent on weight of fiber of said compound remains on said fibers to reduce the fading of dyed polycarbonamide fabrics caused by ozone.

4. The method of claim 3 wherein the polycarbonamide is polycaprolactam.

5. The method of claim 3 wherein the polycarbonamide is polyhexamethylenediamine adipate.

6. The method of claim 1 wherein said coating is applied prior to dyeing said fiber.

7. The method of claim 1 wherein said coating is applied concurrently to dyeing said fiber by adding said compound to a dyebath.

8. The method of claim 1 wherein said coating is applied subsequent to dyeing said fiber.

9. The method of claim 1 wherein said anthraquinone dyes are disperse dyes.

10. The method of claim 1 wherein said anthraquinone dyes are basic dyes.

* * * * *